(No Model.)

V. H. HALLOCK.
SUPPORTER PAD FOR PROPELLER AND OTHER SHAFTS.

No. 315,777. Patented Apr. 14, 1885.

WITNESSES:
William Miller
Otto Hufeland

INVENTOR
Valentine H. Hallock
BY
Van Santvoord & Hauff
ATTORNEYS

UNITED STATES PATENT OFFICE.

VALENTINE H. HALLOCK, OF QUEENS, NEW YORK.

SUPPORTER-PAD FOR PROPELLER AND OTHER SHAFTS.

SPECIFICATION forming part of Letters Patent No. 315,777, dated April 14, 1885.

Application filed February 25, 1885. (No model.)

*To all whom it may concern:*

Be it known that I, VALENTINE H. HALLOCK, a citizen of the United States, residing at Queens, in the county of Queens and State of New York, have invented new and useful Improvements in Supporting-Pads for Propeller and other Shafts, of which the following is a specification.

The object of this invention is to counteract the effect of the weight of a shaft—such, for instance, as a propeller-shaft—upon its bearings or journal-boxes.

The invention consists in the combination, with a shaft, of a water-packed pad, which is brought to bear upon the surface of the shaft, so as to counteract the effect of the weight of said shaft upon its bearings or journal boxes. With this supporting-pad is combined a force-pump with an air-chamber and a graduated valve, so that a uniform and yielding water-pressure can be maintained in the pad. A screw extending from a suitable base serves to adjust and retain the pad in the desired position.

Figure 1:
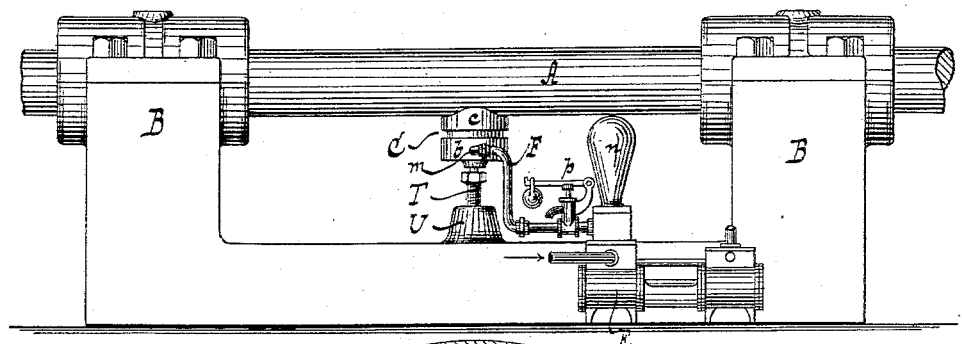
Figure 2:
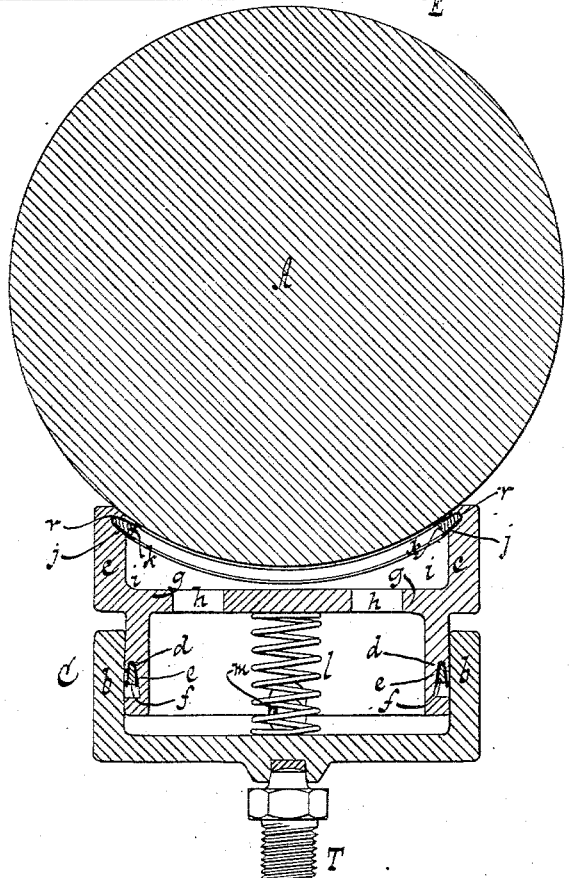

In the accompanying drawings, Figure 1 represents a side view of my supporting-pad as applied to a shaft. Fig. 2 is a transverse section of the supporting-pad and the shaft on a larger scale than the previous figure.

Similar letters indicate corresponding parts.

In the drawings, the letter A designates a shaft—such, for instance, as a propeller-shaft—and B B are pillow-blocks which form the bearings of said shaft. In order to relieve these bearings or journal-boxes of the effect of the weight of the shaft, I apply to the shaft between the pillow-blocks a supporting-pad, C, which consists of two cylinders, $b$ $c$, the cylinder $b$ being bored out to receive the cylinder $c$. In the circumference of the cylinder $c$ is a groove or recess, $d$, into which is placed the leather packing $e$, and a ring, $f$, serves to retain this packing in the recess. When the pad is charged with water under pressure, the outer section of the packing $e$ is forced against the inner surface of the cylinder $b$ by the pressure of the water, and leakage at that point is prevented. The head $g$ of the cylinder $c$ is provided with holes $h$, and with a recess, $i$, and its face is concave, so as to fit the convex surface of the shaft A. In the inner surface of the recess is a groove, $r$, which contains the leather packing $j$, said packing being constructed like the packing $e$, and being retained in position by the ring $k$. When the pad is charged with water under pressure, the concave face of the head is forced up toward the shaft S, and leakage is prevented by the packing $j$, while at the same time comparatively little friction is produced between the pad and the shaft. In order to keep the head $g$ in contact with the shaft when the pad is not charged with water, I have placed into the pad a spring, $l$. The pad C rests upon a screw, T, which is tapped into a suitable base, U. When the screw T is turned so as to screw into the base a sufficient distance, the pad can be removed from the shaft, and when the screw T is screwed up, or out of the base U, the pad is pressed up against the shaft. The screw can be turned by applying a wrench to its polygonal head, or it may be turned by any other suitable means. The pad is supplied with water by means of a force-pump, E, which connects by means of a pipe, F, with the supply-opening $m$ of the pad. The pump E is provided with an air-chamber, $n$, and with a safety-valve, $p$, which is set to the maximum pressure required in the pad. When the pump is set in operation, the pad is charged with water, and when the pressure reaches the desired limit the water blows off through the safety-valve. At the same time the air in the air-chamber becomes compressed and acts as an elastic cushion, whereby the pressure in the pad is rendered yielding to some extent, and the friction between the pad and the shaft is reduced to a minimum.

By the action of my supporting-pad the wear of the journal-boxes is materially reduced, since they are relieved of the pressure usually produced by the weight of the shaft.

In the foregoing description it has been stated that the head of the cylinder $c$ of my pad is provided with a leather packing, $j$, but, if desired, this packing may be left out and a ground joint may be produced between the head of the pad and the shaft, and in order to render this joint tight a suitable material—such as a solution of rubber or leather—may be injected into the pad at the beginning of the operation, and subsequently, whenever such becomes desirable.

What I claim as new, and desire to secure by Letters Patent, is—

1. The combination, with the shaft A, and with the pillow-blocks or journal-boxes in which said shaft revolves, of a water-packed supporting-pad, substantially as shown and described.

2. The combination, with the shaft A, its pillow-blocks or journal-boxes B B, and with the water-packed supporting-pad C, of the force-pump E, its air-chamber $n$, and safety-valve $p$, substantially as shown and described.

3. The combination, with the shaft A, its pillow-blocks or journal-boxes B B, and with the water-packed supporting-pad C, of the adjusting-screw T and base U, substantially as shown and described.

In testimony whereof I have hereunto set my hand and seal in the presence of two subscribing witnesses.

VALENTINE H. HALLOCK. [L.S.]

Witnesses:
W. HAUFF,
E. F. KASTENHUBER.